United States Patent [19]

Horiuchi et al.

[11] Patent Number: 5,106,802
[45] Date of Patent: Apr. 21, 1992

[54] CATALYST FOR PURIFICATION OF EXHAUST GAS FROM DIESEL ENGINE

[75] Inventors: Makoto Horiuchi; Koichi Saito, both of Hyogo, Japan

[73] Assignee: Nippon Shokubai Kagaku Kogyo Co., Ltd., Osaka, Japan

[21] Appl. No.: 660,800

[22] Filed: Feb. 25, 1991

[30] Foreign Application Priority Data

Feb. 26, 1990 [JP] Japan .................................... 2-42481

[51] Int. Cl.$^5$ ........................ B01J 23/72; B01J 23/42; B01J 23/44; B01J 23/46; B01J 23/66
[52] U.S. Cl. .................................. 502/65; 502/353; 502/354; 502/64; 502/66; 502/302; 502/303; 502/304; 502/321; 502/322; 502/324; 502/325; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350
[58] Field of Search ...................... 502/64, 65, 66, 302, 502/303, 304, 321, 322, 324, 325, 332, 333, 334, 335, 336, 337, 338, 339, 340, 341, 342, 343, 344, 345, 346, 347, 348, 349, 350, 353, 354; 423/215.5, 213.5

[56] References Cited

U.S. PATENT DOCUMENTS 4,617,289 10/1986 Saito et al. ......................... 502/339
4,710,487 12/1987 Koch ................................. 502/303

FOREIGN PATENT DOCUMENTS 0203525 5/1986 European Pat. Off. .
0262962 9/1987 European Pat. Off. .
0397411 5/1990 European Pat. Off. .

OTHER PUBLICATIONS

SAE Paper 810263, pp. 111–135. G. Hunter et al.
European Search Report, Dec. 7, 1991, EP 91 30 1547.

*Primary Examiner*—W. J. Shine
*Attorney, Agent, or Firm*—Omri, M. Behr

[57] ABSTRACT

A catalyst for the purification of the exhaust gas from a diesel engine, which catalyst comprises a honeycomb carrier possessing through holes disposed parallelly to the direction of flow of the exhaust gas and a catalyst component possessing a specific surface area of not more than 200 m$^2$/g and deposited on said carrier in a ratio of from 0.01 to 100 g per liter of said carrier and which catalyst possesses a specific surface area of from 0.1 to 5,000 m$^2$/liter of said catalyst.

10 Claims, 1 Drawing Sheet

CATALYST FOR PURIFICATION OF EXHAUST GAS FROM DIESEL ENGINE

BACKGROUND OF THE INVENTION

1. Field of the Invention

This invention relates to a catalyst for the purification of the exhaust gas from a diesel engine. More particularly, it relates to a catalyst to be used in the form of a honeycomb catalyst for removing harmful components from the exhaust gas discharged by a diesel engine.

2. Description of the Prior Art

In recent years, the particulate substances emanating from diesel engines and comprising predominantly solid minute particles of carbon and liquid or solid minute particles of high molecular hydrocarbons (hereinafter referred to collectively as "particulates") have come to pose a problem from the standpoint of environmental hygiene.

The reason for this problem is that the particulates contain such harmful components as carcinogenic substances and these particulates mostly have diameters not exceeding 1 μm and, therefore, are liable to be suspended in the air and inhaled into the human bodies via the respiratory organs. Thus, studies are under way in the direction of exacting the control of discharge of such particulates from diesel engines.

The methods which have been proposed heretofore for removing such particulates from the exhaust gas of a diesel engine include (1) a method which comprises filtering the exhaust gas of a diesel engine through a refractory gas filter (such as, for example, ceramic foam, wire mesh, metal foam, or mesh-closed type ceramic honeycomb) thereby sequestering the particulates, burning the carbonaceous particles accumulated on the filter by the use of heating means such as a burner or an electric heater, regenerating the filter, and putting the regenerated filter to reuse, (2) an improved version of the method of (1) which comprises causing a catalytic substance to be carried on the aforementioned filter thereby lessening the frequency of combustion and regeneration of the filter, and (3) a so-called filter method which comprises effecting combustion of the accumulated particles and purification of the exhaust gas under the conditions of discharge (gas composition and temperature) prevalent under normal running conditions of a diesel engine, for example.

These methods which involve the use of such filters as described above, however, are invariably intended to sequester solid fine carbonaceous particles in a high efficiency. Thus, they have the disadvantage that the filters are cracked by the local heat generated during the combustion of the accumulated particulates and the regeneration of the filters and, further, the filters are clogged and the catalysts are impaired in activity because of the accumulation of ash components (such as, for example, calcium oxide, zinc oxide, and phosphorus pentoxide) originating in the engine oil and sequestered in conjunction with fine carbonaceous particles. Further, the apparatuses which embody the filter-type method for the purification of the exhaust gas have the disadvantage that their operation entails pressure loss. None of the filter-type methods heretofore proposed for the purification of the exhaust gas proves to be fully satisfactory from the practical point of view.

The improvements (such as, for example, an increase in the pressure used for fuel injection and control of the timing of fuel injection) introduced in recent years to the diesel engines have served the purpose of decreasing the amount of particulates discharged from the diesel engines. At the same time, in the particulates discharged from the diesel engines embodying these improvements, the proportion of the fraction predominantly comprising liquid high molecular hydrocarbons and exhibiting solubility in organic solvents (hereinafter referred to as "SOF (soluble organic fraction)") has increased. The exhaust gas emanating from the improved diesel engines differs in behavior from the exhaust gas discharged from the conventional diesel engines. In the purification of the exhaust gas of such a different behavior, therefore, the removal of the SOF predominantly containing harmful components such as carcinogenic substances poses itself an important problem.

As a catalyst for the removal of the SOF in the exhaust gas from the diesel engine, the feasibility of an open type honeycomb catalyst possessing through holes disposed parallelly to the flow of gas has been studied and reported besides the aforementioned filter-type method (SAE Paper, 810263).

This open type honeycomb filter, however, is identical in construction to the honeycomb catalyst used for the purification of the exhaust gas from the ordinary gasoline engine and can be hardly called fit for the purification of the exhaust gas from the diesel engine. None of the catalysts heretofore proposed has proved to be fit for the purification of the exhaust gas possessing the behavior described above.

An object of this invention, therefore, is to provide a novel catalyst for the purification of the exhaust gas from a diesel engine.

Another object of this invention, directed to the purification of the exhaust gas from a diesel engine which has a small content of particulates in the exhaust gas and a large SOF content in the particles, is to provide a fully practicable catalyst capable of effecting the purification with high efficiency and subserving the function satisfactorily without entailing any notable problem in a vehicle operated with a diesel engine.

SUMMARY OF THE INVENTION

These objects are accomplished by a catalyst for the purification of the exhaust gas from a diesel engine, which catalyst comprises a honeycomb carrier possessing through holes disposed parallelly to the direction of the flow of a gas and a catalyst component possessing a specific surface area of not more than 200 $m^2/g$ and deposited on the carrier in a ratio of from 0.01 to 100 g per liter of the carrier and which catalyst possesses a specific surface area of from 0.1 to 5,000 $m^2$/liter.

With a view to fulfilling these objects, we have continued a diligent study on the behavior of a honeycomb catalyst to be manifested in removing the SOF from the exhaust gas of a diesel engine, to find that while the honeycomb catalyst generally possesses a high capacity for removing the SOF from the exhaust gas of a diesel engine, the honeycomb catalyst carried on a wash-coat substrate such as of alumina possessing the same high surface area as the conventional catalyst for the purification of the exhaust gas from a gasoline engine has the disadvantage that, during a protracted exposure to a low-temperature atmosphere as in the idling operation of the engine, the catalyst suffers from accumulation of the portion of the SOF surpassing the capacity for the purification and, during a subsequent elevation of temperature under the operating conditions of high load and high rotation, entails quick release of a large amount of the accumulated SOF.

As a typical example of this adverse situation, one may naturally fancy what happens when a diesel engine is started after a long stop due to traffic congestion as witnessed in the urban district or on the expressway. The SOF is said to contain harmful components such as carcinogenic substance and it is visually and olfactorily perceivable as odor and white smoke. The leakage of the SOF in a high concentration may well constitute itself a drawback serious enough to jeopardize the usefulness of the catalyst from the standpoint of hygiene and quality.

It has been found that a catalyst contemplated by this invention which imposes restrictions on the specific surface area and the amount of a catalytic component carried manifests a capacity for efficient removal of the SOF under the conditions of normal service and, at the same time, enables the amount of the SOF accumulated during protracted exposure to an atmosphere of low-temperature exhaust gas as in the idling operation to be repressed below the amount capable of being purified by the catalytic component and, after the idle operation is switched to a high-load operation, prevents the accumulated SOF from being discharged in a high concentration. This invention has been perfected as the result of this finding.

The main effects brought about by the use of the catalyst of this invention for the purification of the exhaust gas from a diesel engine are as follows.

(1) This catalyst is effective in purifying an exhaust gas which contains such harmful components as carcinogenic substances. Particularly, it is capable of efficiently removing the SOF from the exhaust gas discharged by a diesel engine.

(2) This catalyst, when actually set up in a diesel-engined vehicle, proves to be fully practicable because it refrains from quickly releasing the accumulated SOF in a large amount after a protracted operation under the conditions of low load and low temperature as in the idling operation.

(3) This catalyst obviates the necessity for burning the accumulated particulates and consequently regenerating the exhausted catalyst and exhibits a stable ability to remove the SOF in the exhaust gas from a diesel engine for a long time without entailing such drawbacks as the infliction of a crack on the catalyst during the combustion of particulates and the regeneration of catalyst, the degradation of catalytic activity due to the accumulation of ash components, and the increase of back pressure as observed in the filter-type method.

EXPLANATION OF THE PREFERRED EMBODIMENT

Figure 1:
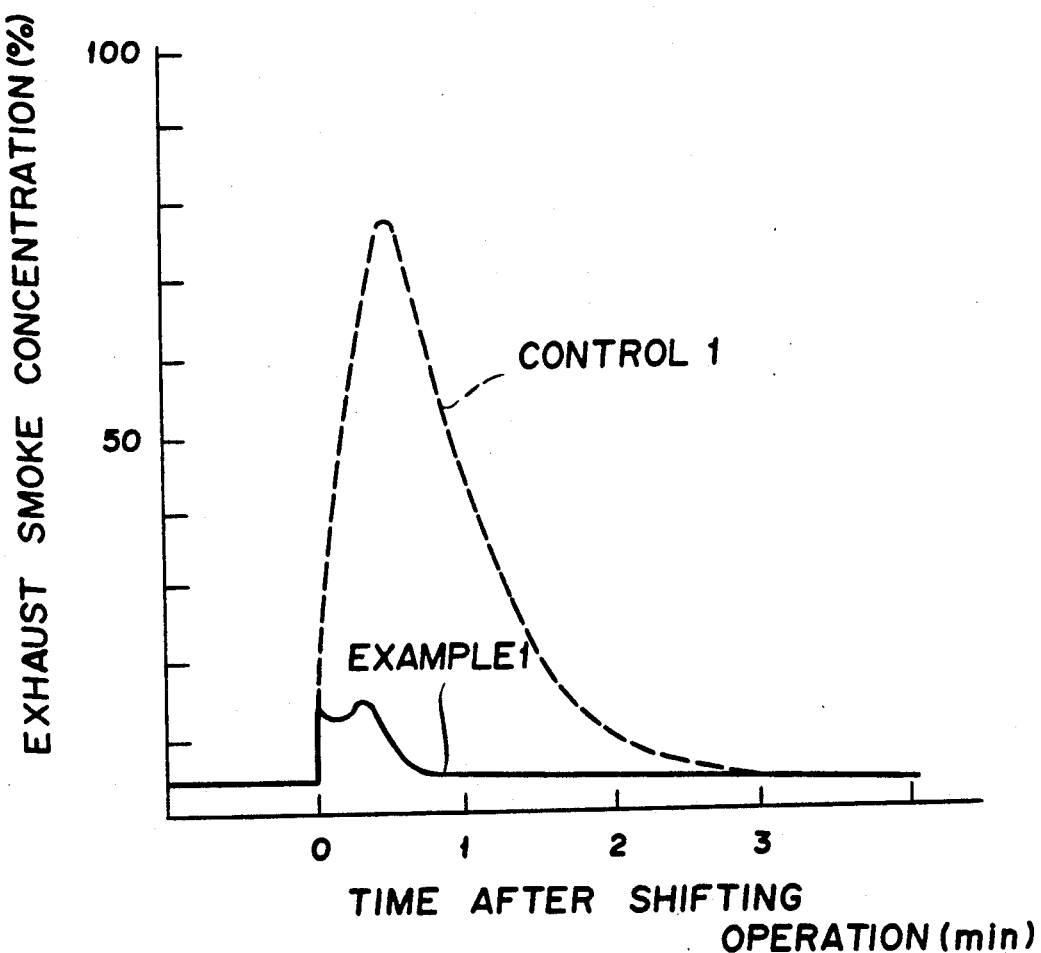
FIG. 1 is a diagram showing the results of a test (for discharge after idling operation) performed on the catalysts obtained in Example 1 and Control 1.

The catalyst of this invention is produced by causing catalyst component possessing a specific surface area of not more than 200 $m^2/g$, preferably 0.1 to 50 $m^2/g$ to be deposited on a carrier in a ratio of from 0.01 to 100 g, preferably from 2 to 50 g, per liter of the carrier and is characterized by having a specific surface area of from 0.1 to 5,000 $m^2$, preferably 0.1 to 2,000 $m^2$, more preferably 0.1 to 500 $m^2$, per liter.

If the specific surface area of the catalyst exceeds 5,000 $m^2$ per liter, the catalyst on protracted exposure to an atmosphere of low-temperature exhaust gas as in the idling operation suffers a large amount of SOF mist to be caught by adsorption thereon and, during the rise of the temperature in the subsequent high-load operation, suffers the accumulated SOF to be released in an amount surpassing the catalysts' ability to purify the exhaust gas. The released SOF during its diffusion in the ambient air is liquefied into a mist of particulates. From the standpoint of practical use, therefore, the catalyst is not preferable to have an unduly large specific surface area. Conversely, if the specific surface area is less than 0.1 $m^2$/liter.

The honeycomb carrier to be used in the honeycomb catalyst of this invention for the purification of the exhaust gas (hereinafter referred to simply as "honeycomb catalyst") is not particularly restricted. Whatever generally passes under the designation of honeycomb carrier may be used effectively for the honeycomb catalyst. Among other conceivable honeycomb catalysts, ceramic honeycombs formed of cordierite, mullite, $\alpha$-alumina, zirconia, titania, titanium phosphate, aluminum titanate, betallite, spondumen, alumina-silicate, and magnesium silicate and integrally structured metal honeycombs produced with such oxidation-resistant refractory metals as stainless steel and a Fe-Cr-Al alloy prove to be particularly advantageous. Especially, a cordierite honeycomb or a metal honeycomb is suitable for the honeycomb catalyst for the purification of the exhaust gas from a diesel engine.

The honeycomb carrier in this invention is of the open type possessing a plurality of through holes disposed parallelly to the flow of the exhaust gas. These through holes have a triangular, tetragonal, or hexagonal cross section (hereinafter referred to as "gas flow holes"). Preferably, the number of gas flow holes per square inch of the cross section of the honeycomb carrier is from 100 to 600, preferably 300 to 500. The honeycomb catalyst of this invention effects conspicuously effective removal of the SOF when the honeycomb carrier used therein possesses an aperture ratio of from 40 to 95%, preferably 60 to 90%. The term "aperture ratio" as used herein refers to the ratio of the total of the cross-sectional areas of all the gas flow holes to the cross-sectional area of the honeycomb carrier.

If the number of gas flow holes is less than 100 or the aperture ratio is less than 40%, the disadvantage arises that the catalyst suffers from a poor ability to effect the removal of the SOF and entails a rise of back pressure because the surface area of the honeycomb structure available for contact with the exhaust gas per unit volume thereof is unduly small. Conversely, if the number of gas flow holes exceeds 600 or the aperture ratio exceeds 95%, the honeycomb structure fails to acquire sufficient strength fit for practical use because the partition walls forming the catalyst structure have an unduly small thickness. The catalyst component to be carried on the honeycomb carrier in the present invention is not particularly restricted. The catalyst components which are preferably usable herein include such catalytically active substances as (a) platinum, palladium, rhodium, iron, zinc, manganese, nickel, cobalt, vanadium, molybdenum, copper, silver, gold, rare earth elements, and alkaline earth elements. These catalytically active substances are used either singly or in the form of a combination of two or more members. There are catalytic components which comprise (a) at least one catalytically active substance selected from the group consisting of platinum, palladium, rhodium, iron, zinc, manganese, nickel, cobalt, vanadium, molybdenum, copper, silver, gold, rare earth elements, and alkaline earth elements and (b) a refractory inorganic oxide. These catalytically active substances are generally in the form of a metal or a metal oxide. Such noble metals as platinum, palladium, and rhodium are in the form of metal and the other elements in the form of an oxide, for example. Among other catalytically active substances mentioned above, at least one noble metal selected from the group consisting of platinum, palladium, and rhodium proves to be particularly desirable.

The refractory inorganic oxide (b) to be used in combination with the catalytically active substance (a) in the catalytic component is at least one member selected from the group consisting of alumina, silica, titania, zirconia, and zeolite. The proportion of the amount of the catalytically active substance (a) to be used is in the range of from 0.01 to 50% by weight, based on the amount of the refractory inorganic oxide (b). Particularly when the catalytically active substance (a) is a noble metal, this proportion is preferable to be in the range of from 0.01 to 20% by weight. When the catalytically active substance (a) is some other element or a compound thereof, the proportion is preferably in the range of from 3 to 30% by weight.

The catalytic component is required to possess a specific surface area of not more than 200 m$^2$/g, preferably from 0.1 to 50 m$^2$/g, and particularly preferably from 0.1 to 10 m$^2$/g.

The following methods, for example, are available for the production of the catalyst which fulfils the requirements described above.

(1) A method which comprises immersing a honeycomb carrier in a solution of a catalytically active substance, drying the resultant impregnated carrier, and calcining the dried carrier at a temperature in the range of from 300° to 900° C., preferably from 400° to 700° C.

(2) A method which comprises immersing a honeycomb carrier in a slurry of a refractory inorganic oxide, removing the excess slurry from the impregnated carrier, drying the wet carrier, calcining the dry carrier at a temperature in the range of from 300° to 900° C., preferably from 400° to 700° C., thereby forming a carrier having the refractory inorganic oxide deposited thereon, immersing this carrier in a solution of a catalytically active substance, drying the impregnated carrier, and then calcining the dry carrier at a temperature in the range of from 300° to 900° C., preferably from 400° to 700° C.

(3) A method which comprises adding a solution of a catalytically active substance to a refractory inorganic oxide in a powdery form, drying the resultant slurry, then calcining the resultant dry mixture at a temperature in the range of from 300° to 900° C., preferably from 400° to 700° C., thereby forming a catalytically active substance-containing refractory inorganic oxide in a powdery form, immersing a honeycomb carrier in a slurry of the powder, drying the impregnated honeycomb carrier, and calcining the dry carrier at a temperature in the range of from 300° to 900° C., preferably from 400° to 700° C.

The honeycomb catalyst of this invention is especially effective in purifying the exhaust gas discharged from a diesel engine, which exhaust gas has a temperature of not more than 200° C., preferably from 80° to 150° C., contains particulates in a ratio of not more than 50 mg, preferably from 10 to 30 mg, per m$^2$ of the exhaust gas, and has a SOF content of not less than 40%, preferably from 50 to 70%, in the particulates.

Now, this invention will be described more specifically below with reference to working examples.

EXAMPLE 1

A slurry was prepared by wet pulverizing 3 kg of alumina possessing a specific surface area of 95 m$^2$/g with water. A cylindrical honeycomb carrier of stainless steel of the following description was immersed in the slurry and the excess slurry was removed from the resultant impregnated honeycomb carrier.

Shape of cell: Corrugated shape
Number of gas flow holes: 300 (per square inch of cross section of honeycomb carrier: which invariably applies hereinafter)
Aperture ratio: 87%
Volume: 2.47 liters [inside diameter of carrier (hereinafter referred to simply as "inside diameter") 5.66 inches and length of carrier (hereinafter referred to simply as "length") 6 inches]

Subsequently, the wet honeycomb carrier was dried at 150° C. for two hours and calcined at 500° C. for two hours, to obtain a honeycomb structure having alumina carried thereon in a ratio of 20 g per liter of the honeycomb carrier.

Then, the alumina-carried honeycomb structure was immersed in 2.5 liters of a solution of palladium nitrate containing 23.1 g of palladium and rhodium nitrate containing 4.6 g of rhodium in deionized water, the excess solution was removed from the resultant impregnated honeycomb structure, the wet honeycomb structure was dried at 150° C. for two hours, and then the dry honeycomb structure was calcined at 500° C. for two hours, to obtain a honeycomb catalyst having palladium and rhodium deposited thereon in the respective ratios of 1.0 g and 0.2 g as metal. The honeycomb catalyst thus obtained was found to possess a specific surface area of 1,885 m$^2$/g per liter.

EXAMPLE 2

One (1) kg of alumina possessing a specific surface area of 40 m$^2$/g was impregnated by thorough stirring with a solution prepared in advance by dissolving chloroplatinic chloride containing 33.3 g of platinum and rhodium borate containing 10 g of rhodium in deionized water, the resultant impregnated alumina was dried at 150° C. for two hours, and the dry alumina was calcined at 500° C. for two hours, to obtain alumina powder containing platinum and rhodium.

A slurry was obtained by wet pulverizing 1 kg of the alumina powder with water. A cylindrical honeycomb carrier of stainless steel of the following description was immersed in the slurry and the excess slurry was removed from the resultant impregnated cylindrical honeycomb carrier.

Shape of cell: Corrugated cell
Number of gas flow holes: 450
Aperture ratio: 83%
Volume: 2.47 liters [inside diameter 5.66 inches and length 6 inches]

Subsequently, the wet honeycomb carrier was dried at 150° C. for two hours and the dry carrier was calcined at 500° C. for two hours, to obtain a honeycomb catalyst having alumina, platinum, and rhodium carried thereon in the respective ratios of 30 g, 1.0 g, and 0.3 g as metal per liter of the honeycomb carrier. The honeycomb catalyst thus obtained was found to possess a specific surface area of 1,133 m²/g per liter.

EXAMPLE 3

Two (2) kg of titania possessing a specific surface area of 8 m²/g was impregnated by thorough stirring in a solution prepared in advance by dissolving palladium nitrate containing 100 g of palladium and rhodium nitrate containing 15 g of rhodium in deionized water, the resultant impregnated titania was dried at 150° C. for two hours, and the dry titania was calcined at 500° C. for one hour, to obtain titania powder containing palladium and rhodium.

A slurry was prepared by wet pulverizing 2 kg of the powder with water. A cylindrical monolithic carrier of cordierite of the following description was immersed in the slurry and the excess slurry was removed from the resultant impregnated cylindrical monolithic carrier.
Number of gas flow holes: About 300
Aperture ratio: 72%
Volume: 2.47 liters [inside diameter 5.66 inches and length 6.0 inches]
Subsequently, the wet monolithic carrier was dried at 150° C. for three hours and the dry carrier was calcined at 400° C. for two hours, to obtain a honeycomb catalyst having titania, palladium, and rhodium carried thereon in the respective ratios of 40 g, 2.0 g, and 0.3 g per liter of the monolithic carrier. The honeycomb catalyst thus obtained was found to possess a specific surface area of 350 m²/liter.

EXAMPLE 4

Two (2) kg of zirconia possessing a specific surface area of 85 m²/g was impregnated by thorough stirring in a solution prepared in advance by dissolving palladium nitrate containing 32 g of palladium, 243 g of copper nitrate, and 528 g of praseodymium in deionized water, the excess solution was removed from the resultant impregnated zirconia, and the resultant wet zirconia was calcined at 500° C. for one hour, to obtain a zirconia powder containing palladium, copper oxide, and praseodymium oxide.

A slurry was prepared by wet pulverizing 2 kg of this powder with water. A cylindrical monolithic carrier of cordierite of the following description was immersed in the slurry and the excess slurry was removed from the monolithic carrier.
Number of gas flow holes: About 400
Aperture ratio: 75%
Volume: 2.47 liters [inside diameter 5.6b inches and length 6.00 inches]
Subsequently, the impregnated monolithic carrier was dried at 150° C. for three hours and the dry carrier was calcined at 400° C. for two hours, to obtain a honeycomb catalyst having zirconia, palladium, copper oxide, and praseodymium oxide carried thereon in the respective ratios of 50 g, 0.8 g, 2 g, and 5 g per liter of the carrier. The honeycomb catalyst consequently obtained was found to possess a specific surface area of 4,186 m²/liter of the catalyst.

EXAMPLE 5

One (1) kg of silica possessing a specific surface area of 19 m²/g was impregnated by thorough stirring in a solution prepared in advance by dissolving palladium nitrate containing 100 g of palladium in deionized water and the resultant impregnated silica was calcined at 500° C. for one hour, to obtain a silica powder containing palladium.

A slurry was prepared by wet pulverizing 2 kg of the powder with water. A cylindrical honeycomb carrier of stainless steel of the following description was immersed in the slurry, the excess slurry was removed from the resultant impregnated honeycomb carrier, the wet honeycomb carrier was dried at 150° C. for three hours, and the dry carrier was calcined at 400° C. for two hours, to obtain a honeycomb catalyst having silica and palladium deposited thereon in the respective ratios of 30 g and 3.0 g per liter of the carrier. The honeycomb catalyst thus obtained was found to possess a specific surface area of 578 m²/liter of the catalyst.

EXAMPLE 6

Three (3) liters of an aqueous solution was obtained by dissolving dinitrodiamino platinum containing 24 g of platinum, 58.2 g of cobalt nitrate, and 30.9 g of silver nitrate in deionized water.

A cylindrical monolithic carrier of cordierite of the following description was immersed in the solution and the excess solution was removed from the resultant impregnated cylindrical monolithid carrier.
Number of gas flow holes: About 400
Aperture ratio: 75%
Volume: 2.47 liters [inside diameter 5.66 inches and length 6.00 inches]
subsequently, the wet monolithic carrier was dried at 150° C. for three hours, to obtain a honeycomb catalyst having platinum, cobalt oxide, and silver oxide in the respective ratios of 0.8 g, 0.5 g, and 0.7 g per liter of the structure.

Control 1

A honeycomb catalyst having palladium and rhodium deposited thereon in the respective ratios of 1.0 g and 0.2 g per liter of the structure was obtained by faithfully following the procedure of Example 1, except that alumina was deposited on the honeycomb structure in a ratio of 150 g per liter of the carrier. The honeycomb catalyst thus obtained was found to possess a specific surface area of 14,270 m²/liter of the catalyst.

The honeycomb carriers, the qualities of catalyst components, and the specific surface areas of honeycomb carriers per liter obtained in Examples 1 to 6 and Control 1 are collectively shown in Table 1.

TABLE 1

| | Honeycomb carrier | | | | Catalyst component deposited | | Honeycomb catalyst |
| | Material | Dimension | Number of through holes | Catalyst component | Specific surface area (m²/g) | Amount of carrier (g/lit.) | Specific surface area (m²/lit of catalyst) |
|---|---|---|---|---|---|---|---|
| Example 1 | metal | 5.66 × 6 | 300 | Al₂O₃/Pd/Rh | 95 | 21.2 | 1880 |
| Example 2 | metal | 5.66 × 6 | 450 | Al₂O₃/Pt/Rh | 40 | 31.3 | 1130 |
| Example 3 | cordierite | 5.66 × 6 | 300 | TiO₂/Pd/Rh | 8 | 45.3 | 350 |
| Example 4 | cordierite | 5.66 × 6 | 400 | ZrO₂/Pd/CuO/Pr₆O₇ | 85 | 57.8 | 4180 |
| Example 5 | metal | 5.66 × 4 | 500 | SiO₂/Pd | 19 | 33.0 | 578 |
| Example 6 | cordierite | 5.66 × 6 | 400 | Pt/CoO/Ag₂O | — | 2.0 | 70 |

TABLE 1-continued

| | Honeycomb carrier | | | Catalyst component deposited | | | Honeycomb catalyst |
| | Material | Dimension | Number of through holes | Catalyst component | Specific surface area (m²/g) | Amount of carrier (g/lit.) | Specific surface area (m²/lit of catalyst) |
|---|---|---|---|---|---|---|---|
| Control 1 | metal | 5.66 × 6 | 300 | Al₂O₃/Pd/Rh | 95 | 151.2 | 14270 |

EXAMPLE 7

The honeycomb catalysts of Examples 1 to 6 and Control 1 were tested for the following properties by the use of a commercially available supercharging direct-injection diesel engine (4 cylinders, 2,800 cc).

(Test for performance)

The exhaust gas discharged from the diesel engine packed with a given catalyst and operated under the conditions of 2,000 rpm in engine rotational rate, 8.0 kg.m in torque, and 300° C. in catalyst inlet temperature was examined by the ordinary dilution tunnel method to determine the amounts of particulates contained in the exhaust gas at the inlet and the outlet of the catalyst bed and find the ratio of removal (%) of the particulates (Part.). The samples of the exhaust gas taken at the inlet and the outlet of the catalyst bed were analyzed for gaseous hydrocarbon (THC) and CO and tested for back pressure to determine the ratios of conversion (%) of THC and CO. (Test of exhaust gas discharged after idling operation)

A given honeycomb catalyst was exposed for three hours to an atmosphere of the exhaust gas emanating from the diesel engine kept in an idling operation under the condition of 80° C. in inlet temperature of the catalyst bed. Then, the conditions of the engine operation were changed to 2,000 rpm in rotational rate and 14.3 kg.m in torque. For 5 minutes under the changed operating conditions, the exhaust gas was tested for exhaust smoke concentration (%) by the use of a light transmission type smoke meter.

The results of the maximum exhaust smoke concentration (%) obtained by (Test for performance) and (Test of exhaust gas discharged after idling operation) described above are shown below in Table 2.

The results of (Test of exhaust gas discharged after idling operation) performed with the catalysts of Example 1 and Control 1 are shown in FIG. 1.

It is understood from the results given above that the honeycomb catalyst of this invention is a catalyst of high practical utility capable of efficiently removing such harmful components as SOF, HC, and CO under ordinary operating conditions without inducing leakage of the adsorbed SOF in a large amount even after protracted exposure to an atmosphere of low load and low temperature as in the idling operation.

What is claimed is:

1. A catalyst for the purification of the exhaust gas from a diesel engine, which catalyst comprises a honeycomb carrier possessing through holes disposed parallel to the direction of flow of the exhaust gas and a catalyst component possessing a specific surface area of not more than 200 m²/g and deposited on said carrier in a ratio of from 0.01 to 100 g per liter of said carrier and which catalyst possesses a specific surface area of from 0.1 to 5,000 m²/liter of said catalyst.

2. A catalyst according to claim 1, wherein said specific surface area of the catalyst is in the range of from 0.1 to 2,000 m²/liter of the catalyst.

3. A catalyst according to claim 1, wherein said specific surface area of the catalyst is in the range of from 0.1 to 500 m²/liter of the catalyst.

4. A catalyst according to claim 1, wherein said honeycomb carrier is a ceramic carrier or a metal carrier.

5. A catalyst according to claim 1, wherein said catalyst component is formed of at least one element selected from the group consisting of platinum, palladium, rhodium, copper, silver, gold, iron, zinc, manganese, nickel, cobalt, vanadium, molybdenum, alkaline earth elements, and rare earth elements.

6. A catalyst according to claim 1, wherein said catalyst component is formed of (a) a catalytically active substance comprising at least one element selected from the group consisting of platinum, palladium, rhodium, copper, silver, gold, iron, zinc, manganese, nickel, cobalt, vanadium, molybdenum, alkaline earth elements, and rare earth elements and (b) a refractory inorganic oxide.

7. A catalyst according to claim 6, wherein said refractory inorganic oxide is at least one member selected from the group consisting of alumina, titania, zirconia, and zeolite.

8. A catalyst according to claim 1, wherein the amount of said catalyst component is in the range of from 2 to 50 g per liter of said catalyst.

9. A catalyst according to claim 2, wherein the specific surface area of said catalyst component is in the range of from 0.1 to 50 m²/g.

10. A catalyst according to claim 5, wherein the proportion of said catalytically active substance to be used is in the range of from 0.01 to 50% by weight, based on the amount of said refractory inorganic oxide.

* * * * *

TABLE 2

| | | Test for performance | | | Test of exhaust gas |
| | Specific surface area of honeycomb catalyst (m²/liter) | Ratio of removal of Part (300° C.) (%) | Ratio of conversion of THC (300° C.) (%) | Ratio of conversion of CO (300° C.) (%) | Maximum exhaust smoke content (%) |
|---|---|---|---|---|---|
| Example 1 | 1880 | 47 | 82 | 75 | 15 |
| Example 2 | 1130 | 39 | 86 | 91 | 14 |
| Example 3 | 500 | 42 | 76 | 82 | 17 |
| Example 4 | 4180 | 44 | 74 | 70 | 28 |
| Example 5 | 578 | 38 | 72 | 75 | 17 |
| Example 6 | 70 | 41 | 83 | 86 | 13 |
| Control 1 | 14270 | 45 | 81 | 71 | 78 |